United States Patent [19]

Pruett et al.

[11] Patent Number: 4,707,537
[45] Date of Patent: Nov. 17, 1987

[54] UV-ABSORBING CONDENSATION POLYMERIC COMPOSITIONS AND PRODUCTS THEREFROM

[75] Inventors: Wayne P. Pruett; Richard H. S. Wang, both of Kingsport; Samuel D. Hilbert, Jonesborough; Max A. Weaver, Kingsport, all of Tenn.

[73] Assignee: Eastman Kodak Company, Rochester, N.Y.

[21] Appl. No.: 913,204

[22] Filed: Sep. 30, 1986

[51] Int. Cl.$^4$ .................. C08G 63/44; C08G 69/44
[52] U.S. Cl. .................. 528/288; 528/171; 528/172; 528/176; 528/183; 528/290
[58] Field of Search ........... 528/176, 183, 288, 290

[56] References Cited

U.S. PATENT DOCUMENTS 4,361,695  11/1982  DiBattista et al. .......... 528/289
4,547,563  10/1985  Cholod .................... 528/173

*Primary Examiner*—Lucille M. Phynes
*Attorney, Agent, or Firm*—William P. Heat, Jr.; J. Frederick Thomsen

[57] ABSTRACT

Polyester compositions useful in formed articles such as beverage bottles and having condensation reacted therein at least one UV-absorbing compound of the formula

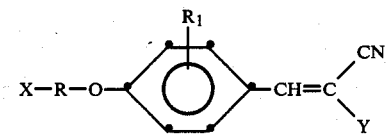

wherein X is hydroxyl, carboxy, carbalkoxy, substituted carbalkoxy, or acyloxy; Y is cyano, carbamyl, substituted carbamyl, aryl, acyl, alkylsulfonyl, substituted alkylsulfonyl, phenylsulfonyl, or substituted phenylsulfonyl; R is selected from -alkylene-O-alkylene-, -alkylene-S-alkylene-, -alkylene-N(-SO$_2$alkyl)-alkylene-, straight or branched chain alkylene or such alkylene substituted with an X substituent; and R$_1$ is hydrogen or 1-3 groups selected from alkyl, alkoxy and halogen.

7 Claims, No Drawings

UV-ABSORBING CONDENSATION POLYMERIC COMPOSITIONS AND PRODUCTS THEREFROM

This invention concerns condensation polymers including polyester and polycarbonate types, wherein certain UV (ultraviolet light) absorbing methine compounds have been reacted into the polymer as a chain terminator to impart UV screening properties thereto. Many products such as fruit juices, soft drinks, wines, food products, cosmetics and shampoos are deleteriously affected by UV light when packaged in clear plastic containers which pass significant portions of the available light at any wavelength from approximately 250 to 390 nm. By use of the present compounds polymeric containers can be manufactured which absorb these harmful wavelengths and therefore reduce or eliminate the UV light degradation of products packaged therein.

A further advantage of the present polymeric compositions is that conventional polyester dyes and other additives such as pigments, fillers, brighteners and the like may be incorporated therein, and the UV screening properties of the methine compounds impart significant stabilization to both the polyester and the dyes.

The present compounds are thermally stable and nonsublimable at the polymer preparation and processing temperatures, are fast to light and are nonextractable from the polymers, thus rendering the polymers particularly suitable for use as beverage bottles and food, pharmaceutical and cosmetic containers wherein the compound cannot contaminate the contents. The methine compounds are useful in total concentrations given herein in parts per million (ppm) ranging from about 1.0 to about 5,000, preferably 2.0 to about 1,500 (parts by weight of methine compound per million parts by weight of condensation polymer).

The present polymers are linear, thermoplastic, molding or fiber grade having an I.V. of from about 0.4 to about 1.2, and preferably are polyesters wherein the acid moiety is comprised of at least about 50 mol % terephthalic acid residue, and the glycol moiety of at least about 50 mol % ethylene glycol or 1,4-cyclohexanedimethanol residue, and containing a total of from about 2 to 1,500 ppm of one or more of the reacted methine compounds.

In accordance with the present invention, certain UV-absorbing methine compounds defined below are reacted with the condensation polymer and impart thereto the property of ultraviolet or visible light absorption generally with a maximum absorbance within the range of from about 320 nm to about 380 nm. These compounds preferably have molecular weights of from about 200 to about 600 although higher molecular weight compounds are also operable. These compounds contain a hydroxy or an acid or ester group which condenses onto the polymer chain as a terminator. As aforesaid, these compounds are thermally stable at polymer processing conditions, which includes polycondensation temperatures of up to about 300° C. which are employed, for example, in the preparation of polyesters such as poly(ethylene terephthalate) and copolymers of poly(ethylene terephthalate) and poly(1,4-cyclohexylenedimethylene terephthalate).

The present invention is defined in its broad embodiment as a composition comprising molding or fiber grade condensation polymer having reacted therewith a total of from 1.0 to about 5,000 ppm, of at least one compound of the formula

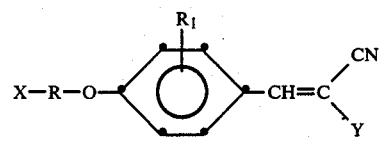

having its maximum absorbance (λ max) in the range of from about 320 nm to about 380 nm, and being nonextractable from said polymer and stable under the polymer preparation and processing conditions wherein in the above formula: X is hydroxyl, carboxy, carbalkoxy, substituted carbalkoxy, or acyloxy; Y is cyano, carbamyl, substituted carbamyl, aryl, acyl, alkylsulfonyl, substituted alkylsulfonyl, phenylsulfonyl, or substituted phenylsulfonyl; R is selected from -alkylene-O-alkylene-, -alkylene-S-alkylene-, -alkylene-N(-SO$_2$alkyl)-alkylene-, straight or branched chain alkylene or such alkylene substituted with an X substituent; and R$_1$ is hydrogen or 1-3 groups selected from alkyl, alkoxy and halogen. In these compounds, the various alkyl and alkylene moieties have 1-20, preferably 1-8 carbons.

Preferred methine compounds are those of the above formula wherein:

X is hydroxy;
R is alkylene of 1-8 carbons;
R$_1$ is hydrogen or alkoxy of 1-8 carbons;
Y is cyano, carbamyl, alkyl carbamyl, or alkylsulfonyl; and the carbalkoxy groups of X are substituted with hydroxyl, alkoxy, and halogen.

A most preferred polyester composition contains the reaction residue of the compound

in from about 10 to about 300 ppm.

The nonextractabilities of the present methine compounds are determined as follows:

EXTRACTION PROCEDURE

All extractions are done in glass containers with distilled solvents under the time and temperature conditions described below. The sample form is ½ inch×2½ inch segments cut from the cylindrical side wall portion of 2-liter bottles. All samples are washed with cold solvent to remove surface contaminants and are exposed using 200 ml. solvent/100 in.² surface area (2 ml/in.²).

Solvent blanks are run under the same extraction conditions without polymer. In most cases samples are extracted, spiked, and analyzed in duplicates.

EXTRACTION CONDITIONS

1. Water.

The samples at room temperature are added to solvent and heated at 250° F. for two hours. Half of the samples are then analyzed and the remainder are placed in a 120° F. oven for 30 days.

2. 50% Ethanol/Water.

The samples at room temperature are added to the solvent at room temperature, placed in an oven at 120° F. and analyzed after 24 hours and 30 days.

3. Heptane.

The samples at room temperature are added to solvent at room temperature and heated at 150° F. for 2 hours. Part of the samples are cooled to room temperature and analyzed spectrophotometrically and the remainder are allowed to age at 120° F. for 30 days before analysis.

4. Any suitable analytical technique and apparatus may be employed to determine the amount of methine compound extracted from the polymer. The extractability of the present compounds is found to be essentially nonexistent.

The types of polyesters useful in this invention for reaction with the methine compounds are those produced by conventional techniques using one or more diols and one or more dicarboxylic acids. Typical of these polyesters are those disclosed, for example, in U.S. Pat. No. 4,359,570 incorporated herein by reference.

The diol components of the polyester are selected, for example, from ethylene glycol, 1,4-cyclohexanedimethanol, 1,2-propanediol, 1,3-propanediol, 1,4-butanediol, 2,2-dimethyll, 3-propanediol, 1,6-hexanediol, 1,2-cyclohexanediol, 1,4-cyclohexanediol, 1,2-cyclohexanedimethanol, 1,3-cyclohexanedimethanol, X,8-bis(hydroxymethyl)tricyclo-[5.2.1.0]-decane wherein X represents 3, 4, or 5, and diols containing one or more oxygen atoms in the chain, e.g., diethylene glycol, triethylene glycol, dipropylene glycol, tripropylene glycol and the like containing from about 2 to about 18, preferably 2 to 12 carbon atoms in each aliphatic moiety. Cycloaliphatic diols can be employed in their cis or trans configuration or as mixtures of both forms.

The acid components (aliphatic, alicyclic, or aromatic dicarboxylic acids) of the polyester are selected, for example, from terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, and the like. In the polymer preparation, it is often preferable to use a functional acid derivative thereof such as the dimethyl, diethyl, or dipropyl ester of the dicarboxylic acid. The anhydrides of these acids also can be employed.

The preferred copolyesters are especially useful for making blow-molded bottles or containers for beverages, and for molded food packages and the like. In this regard, certain of these copolyesters are color, I.V., and heat distortion or "hot fill" stable at temperatures of up to about 100° C. when properly heat set, and molded articles therefrom exhibit good thin wall rigidity, excellent clarity and good barrier properties with respect to water and atmospheric gases, particularly carbon dioxide and oxygen.

In regard to products having the "hot fill" stability, the most preferred polyesters therefor comprise poly(ethylene terephthalate) and this polymer modified with up to about 5 mole % of 1,4-cyclohexanedimethanol, wherein the polymers have been sufficiently heat set and oriented by methods well known in the art to give a desired degree of crystallinity. By definition, a polymer is "hot fill" stable at a prescribed temperature when less than 2% change in volume of a container manufactured therefrom occurs upon filling the same with a liquid at that temperature. For the particular application of blow-molded beverage bottles, these most preferred polyesters have an I.V. of 0.65 to 0.85, and a Tg of >70° C., and film sections cut from the bottle have a Water Vapor Transmission Rate of 1.5 to 2.5 g. mils/100 in.$^2$-24 hrs., a $CO_2$ Permeability of 20–30 cc. mils/100 in.$^2$-24 hrs.-atm., and an $O_2$ Permeability of 4–8 cc. mils/100 in.$^2$-24 hrs.-atm. The Tg is determined by Differential Scanning Calorimetry at a scan rate of 20 Centigrade Degrees/min., the $O_2$ Permeability by the standard operating procedure of a MOCON OXTRAN 100 instrument of Modern Controls, Inc., of Elk River, Minn., and the $CO_{-2}$ Permeability by the standard operating procedure of a MOCON PERMATRAN C II, also of Modern Controls.

The following examples will illustrate syntheses of the present methine compounds I, wherein the general route for their preparation is as follows:

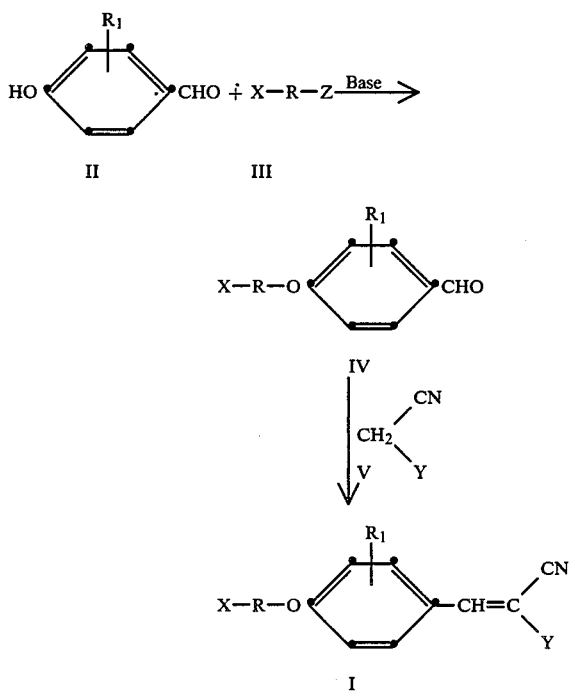

wherein p-hydroxybenzaldehydes II are alkylated by III (Z=chloro, bromo, iodo, or fluoro) in the presence of a base to produce intermediate aldehydes IV, which are then reacted with active methylenes V under Knoevenagel reaction conditions to produce I. It is usually convenient to react II with III in water with one equivalent of base such as sodium hydroxide present. Lower alcohols such as methanol, ethanol, and isopropanol are convenient solvents for reacting intermediate aldehydes IV with active methylenes V. Bases such as piperidine, piperidine acetate, sodium acetate, and pyridine are effective in promoting the condensation reaction to produce I. The following examples will further illustrate the practice of the invention.

EXAMPLE 1

Preparation of 4-(2-Hydroxyethoxy)3-methoxybenzaldehyde

Vanillin (15.2 g, 0.01 m), water (70 mL), and sodium hydroxide (5.0 g, 0.0125 m) are mixed and stirred for a few minutes until solution is completed. 2-Chloroethanol (9.7 g, 0.012 m) is added and the reaction mixture heated at reflux for 16 hours and then cooled. The solid product is collected by filtration, washed with water, dried, and finally recrystallized from toluene. The yield is 13.0 g (69.9% of the theoretical yield).

EXAMPLE 2

Reaction of 4-(2-Hydroxyethoxy)-3-methoxybenzaldehyde With Active Methylene Compound A mixture of 4-(2-hydroxyethoxy)-3-methoxybenzaldehyde (0.98 g, 0.005 m), α-cyano-N-phenylacetamide (0.80 g, 0.005 m), ethanol (15 mL), and piperidine (3 drops) is heated at reflux for one hour and cooled. The pale yellow product is collected by filtration, washed with ethanol, and dried in air (Yield—1.0 g). It is fluorescent under long wavelength ultra-violet light and has an absorption maximum at 359 nm in its UV absorption spectrum in methylene chloride.

A typical polyester of this invention is prepared in accordance with Example 3 below.

The inherent viscosities (I.V.) of the copolyesters of this invention are determined according to ASTM D2857-70 procedure in a Wagner Viscometer of Lab Glass Inc. of Vineland, N.J. having a ½ ml. capillary bulb, using a polymer concentration of 0.5% by weight in 60/40 by weight, phenol/tetrachloroethane solvent. The procedure comprises heating the polymer/solvent system at 120° C. for 15 minutes to enhance dissolution of the polymer, cooling the solution to 25° C. and measuring the time of flow at 25° C. The I.V. is calculated from the equation $$(\eta)_{0.50\%}^{25°\,C.} = \frac{\ln \frac{t_s}{t_o}}{C}$$

where:
- $(\eta)$ = Inherent viscosity at 25° C. at a polymer concentration of 0.5 g./100 ml. of solvent;
- ln = Natural logarithm;
- $t_s$ = Sample flow time;
- $t_o$ = Solvent-blank flow time; and
- C = Concentration of polymer in grams per 100 ml. of solvent = 0.50.

EXAMPLE 3

Preparation of Poly(ethylene terephthalate) Copolymerized With {[4-(2-Hydroxyethoxy)phenyl]methylene}malononitrile The following ingredients are placed in a 500-mL, single-necked, round-bottom flask:
- 97 g (0.5 mol) dimethyl terephthalate;
- 62 g (1.0 mol) ethylene glycol;
- 0.0192 g {[4-(2-hydroxyethoxy)phenyl]methylene} malononitrile;
- 0.032 mL of a n-butanol solution of acetyl triisopropyl titanate which contains 0.00096 g titanium;
- 1.1 mL of an ethylene glycol solution of Mn (OCOCH$_3$)$_2$.4H$_2$O which contains 0.0053 g Mn;
- 2.3 mL of an ethylene glycol solution of Sb (OCOCH$_3$)$_3$ which contains 0.0216 g Sb; and
- 0.64 mL of an ethylene glycol solution of Co(OCOCH$_3$)$_2$.4H$_2$O which contains 0.0072 g Co.

The flask is equipped with a nitrogen inlet, stirrer, vacuum outlet, and condensing flask. The flask and contents are heated at 200° C. in a Belmont metal bath and at 210° C. for 75 minutes with a nitrogen sweep over the reaction mixture. 0.9 ML of an ethylene glycol slurry of Zonyl A which contains 0.007 g phosphorus are then added. The temperature is increased to 265° C. At 265° C., a vacuum with a slow stream of nitrogen bleeding in the system is applied over a ten minute period until the pressure is reduced to 100 mm Hg. The flask and contents are heated at 265° C. under a vacuum of 100 mm Hg for 20 minutes. The metal bath temperature is increased to 280° C. and the pressure is slowly reduced to 4.5 mm Hg. The flask and contents are heated at 280° C. under a vacuum of 4.5 mm Hg for 55 minutes. The pressure is then reduced to 0.1 to 0.3 mm Hg and polycondensation is continued for 75 minutes. The flask is removed from the metal bath and is allowed to cool in nitrogen atmosphere while the polymer crystallizes. The resulting polymer has an inherent viscosity of 0.59. A UV-visible spectrum on amorphous film of the polymer shows an absorption peak at 345 nm.

The following table gives exemplary compounds of the present invention wherein the CO$_2$ represents in the alternative

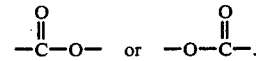

TABLE 1

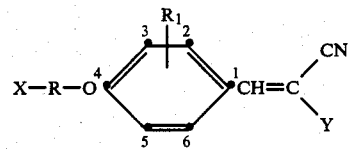

| Example No. | X | R | R$_1$ | Y |
|---|---|---|---|---|
| 4 | OH | —CH$_2$CH$_2$— | H | CN |
| 5 | OH | —CH$_2$CH$_2$— | H | CONH$_2$ |
| 6 | OH | —CH$_2$CH$_2$— | H | CONHC$_6$H$_5$ |
| 7 | OH | —CH$_2$CH$_2$— | H | SO$_2$CH$_3$ |
| 8 | OH | —CH$_2$CH$_2$CH$_2$— | H | SO$_2$C$_6$H$_5$ |
| 9 | OH | —CH$_2$CH$_2$CH$_2$CH$_2$— | H | SO$_2$C$_4$H$_9$—n |
| 10 | OH | —CH$_2$CH(CH$_3$)— | H | CONHC$_2$H$_5$ |
| 11 | OH | —CH$_2$CH$_2$OCH$_2$CH$_2$— | H | CON(CH$_3$)$_2$ |
| 12 | OH | —CH$_2$CH$_2$SCH$_2$CH$_2$— | H | CON(CH$_3$)C$_6$H$_5$ |

TABLE 1-continued

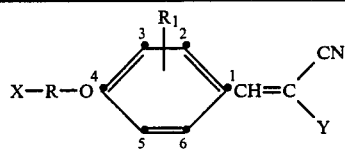

| Example No. | X | R | $R_1$ | Y |
|---|---|---|---|---|
| 13 | OH | —CH₂CH₂CH₂— | H | $CONHC_6H_{11}$ |
| 14 | OH | —CH₂CH₂N(SO₂CH₃)CH₂CH₂— | H | $COC_6H_5$ |
| 15 | OH | —CH₂CH(CH₃)CH₂— | H | $COC(CH_3)_3$ |
| 16 | OH | —CH₂CH₂— | 3-OCH₃ | $COC_6H_5$ |
| 17 | OH | —CH₂CH₂— | 3-OCH₃ | CN |
| 18 | OH | —CH₂CH₂— | 3-OCH₃ | $SO_2CH_3$ |
| 19 | OH | —CH₂CH₂— | 3-OCH₃ | $SO_2C_6H_5$ |
| 20 | OH | —CH₂CH₂— | 3-OCH₃ | $SO_2C_6H_4$—o-Cl |
| 21 | OH | —CH₂CH₂— | 3-OCH₃ | $SO_2C_6H_4$—p-CH₃ |
| 22 | OH | —CH₂CH₂— | 3-OCH₃ | $SO_2C_6H_4$—o-Cl |
| 23 | OH | —CH₂CH₂— | 3-OCH₃ | $CONHC_6H_4$—p-CH |
| 24 | OH | —CH₂CH₂— | 3,5-di-OCH₃ | CN |
| 25 | OH | —CH₂CH₂— | 3,5-di-OCH₃ | $CONHC_6H_5$ |
| 26 | OH | —CH₂CH₂— | 3,5-di-OCH₃ | $SO_2C_2H_5$ |
| 27 | OH | —CH₂CH₂— | 2,5-di-CH₃ | CN |
| 28 | OH | —CH₂CH₂— | 3-CH₃ | $CONH_2$ |
| 29 | OH | —CH₂CH₂— | 2-Cl | $SO_2C_6H_{11}$ |
| 30 | OH | —CH₂CH₂— | 2,5-diCl | CN |
| 31 | COOH | —CH₂— | H | CN |
| 32 | COOH | —CH₂CH₂OCH₂CH₂— | H | CN |
| 33 | CO₂CH₃ | —CH₂— | H | CN |
| 34 | CO₂C₂H₅ | —CH₂CH₂CH₂— | H | CN |
| 35 | CO₂CH(CH₃)₂ | —CH₂— | H | CN |
| 36 | CO₂CH₃ | —CH₂— | H | $SO_2CH_3$ |
| 37 | CO₂C₂H₄OH | —CH₂— | H | $SO_2C_6H_5$ |
| 38 | CO₂CH₂CH₂OCH₃ | —CH₂— | H | $C_6H_5$ |
| 39 | CO₂C₆H₁₁ | —CH₂— | H | CN |
| 40 | CO₂CH₂CH₂Cl | —CH₂— | H | CN |
| 41 | CO₂CH₂CH₂NHCOCH₃ | —CH₂— | H | CN |
| 42 | OH | —CH₂—CH(OH)CH₂— | H | CN |
| 43 | OH | —CH₂CH(Cl)CH₂— | H | CN |
| 44 | OH | —CH₂CH(OCH₃)CH₂— | H | $SO_2CH_3$ |
| 45 | OOCCH₃ | —CH₂CH(COCH₃)—CH₂— | H | CN |
| 46 | OOCCH₃ | —CH₂CH₂— | H | CN |
| 47 | OCOOC₂H₅ | —CH₂CH₂— | H | CN |
| 48 | OOCC₆H₅ | —CH₂CH₂— | H | CN |
| 49 | OOCC₆H₁₁ | —CH₂CH₂— | H | CN |

TABLE 1-continued

| Example No. | X | R | $R_1$ | Y |
|---|---|---|---|---|
| 50 | COOH | —CH$_2$CH(COOH)—CH$_2$— | H | CN |
| 51 | 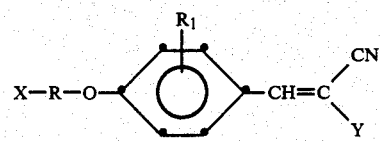 (CO$_2$CH$_2$—[thiophene ring]) | —CH$_2$— | H | CN |
| 52 | CO$_2$C$_2$H$_5$ | —CH$_2$ | 3-OCH$_3$ | CN |

This invention has been described in detail with particular reference to preferred embodiments thereof, but it will be understood that variations and modifications can be effected within the spirit and scope of the invention.

What is claimed is:

1. A polyester composition having a maximum light absorbance within the range of from about 320 nm to about 380 nm and having reacted therein a total of from about 1.0 to about 5,000 parts by weight per million parts by weight of polyester of at least one UV-absorbing compound of the formula $$X-R-O-\underset{R_1}{\underset{|}{\text{Ar}}}-CH=C\begin{subarray}{l}CN\\Y\end{subarray}$$

wherein X is hydroxyl, carboxy, carbalkoxy, substituted carbalkoxy, or acyloxy; Y is cyano, carbamyl, substituted carbamyl, aryl, acyl, alkylsulfonyl, substituted alkylsulfonyl, phenylsulfonyl, or substituted phenylsulfonyl; R is selected from -alkylene-O-alkylene-, -alkylene-S-alkylene-, -alkylene-N(-SO$_2$alkyl)-alkylene-, straight or branched chain alkylene or such alkylene substituted with an X substituent; and $R_1$ is hydrogen or 1–3 groups selected from alkyl, alkoxy and halogen.

2. A polyester composition of claim 1 having an inherent viscosity of from about 0.4 to about 1.2 determined according to ASTM D2857-70 procedure in a Wagner Viscometer of Lab Glass Inc. of Vineland, N.J. having a ½ ml. capillary bulk, using a polymer concentration of 0.5% by weight in 60/40 by weight, phenol/tetrachloroethane solvent wherein:

X is hydroxy;
R is alkylene of 1–8 carbons
$R_1$ is hydrogen or alkoxy of 1–8 carbons; and
Y is cyano, carbamyl, alkyl carbamyl, or alkylsulfonyl.

3. A polyester composition of claim 1 having copolymerized therein the compound of the structure $$HO-CH_2CH_2O-\text{[phenyl]}-CH=C\begin{subarray}{l}CN\\CN\end{subarray}$$

4. A polyester composition of claim 1 wherein the acid moiety is comprised of at least about 50 mol % terephthalic acid residue, and the glycol moiety of at least about 50 mol % ethylene glycol or 1,4-cyclohexanedimethanol residue.

5. A polyester composition of claim 2 having an inherent viscosity of from about 0.65 to about 0.85, wherein the acid moiety is 100 mol % terephthalic acid residue, and the glycol moiety is 100 mol % ethylene glycol residue.

6. A polyester composition of claim 2 having an inherent viscosity of from about 0.65 to about 0.85, wherein the acid moiety is 100 mol % terephthalic acid residue, and the glycol moiety is comprised of from about 65 to about 95 mol % ethylene glycol residue, the remainder being 1,4-cyclohexanedimethanol residue.

7. A formed article of the polyester composition of any of claims 1–6.

* * * * *